(12) United States Patent
Hammon et al.

(10) Patent No.: US 6,548,225 B1
(45) Date of Patent: Apr. 15, 2003

(54) METHOD AND APPARATUS FOR WRITING GRATINGS

(75) Inventors: Timothy Edward Hammon, Silver Spring, MD (US); Jonathan Mark Bulman, Cremorne (AU); Thomas David Stephens, Columbia, MD (US)

(73) Assignee: JDS Uniphase Pty Limited, North Ryde (AU)

( * ) Notice: Subject to any disclaimer, the term of this patent is extended or adjusted under 35 U.S.C. 154(b) by 0 days.

(21) Appl. No.: 09/367,445

(22) PCT Filed: Feb. 13, 1998

(86) PCT No.: PCT/AU98/00086

§ 371 (c)(1),
(2), (4) Date: Oct. 22, 1999

(87) PCT Pub. No.: WO98/36296

PCT Pub. Date: Aug. 20, 1998

(30) Foreign Application Priority Data

Feb. 14, 1997 (AU) .............................. PO 5126

(51) Int. Cl.[7] ................................. G02B 5/18
(52) U.S. Cl. ..................... 430/321; 430/1; 430/2; 356/346; 359/34; 359/35; 385/37; 385/122
(58) Field of Search ...................... 430/321, 1, 2; 385/37, 122; 359/35, 34; 356/346

(56) References Cited

U.S. PATENT DOCUMENTS

| | | | | |
|---|---|---|---|---|
| 3,689,367 A | * | 9/1972 | Little, Jr. et al. ............ 430/1 |
| 4,793,680 A | * | 12/1988 | Byron ....................... 385/37 |
| 4,959,283 A | * | 9/1990 | Smothers et al. ............ 430/1 |
| 5,066,133 A | * | 11/1991 | Brienza ..................... 359/12 |
| 5,388,173 A | * | 2/1995 | Glenn ....................... 359/34 |
| 5,440,669 A | * | 8/1995 | Rakuljic et al. ............. 359/7 |
| 5,539,517 A | * | 7/1996 | Cabib et al. ............... 356/346 |
| 5,552,882 A | * | 9/1996 | Lyons et al. ................ 359/34 |
| 5,619,603 A | | 4/1997 | Epworth et al. ............. 385/37 |
| 5,708,738 A | | 1/1998 | Perez et al. ................ 385/37 |
| 5,777,736 A | * | 7/1998 | Horton ..................... 356/346 |
| 5,892,597 A | * | 4/1999 | Iwata et al. ................ 359/12 |

FOREIGN PATENT DOCUMENTS

| | | |
|---|---|---|
| EP | 0176812 | 4/1986 |
| WO | 9721120 | 6/1997 |

OTHER PUBLICATIONS

Martin, et al., "Novel writing technique of long and highly reflective in–fibre gratings" Electron. Lett., vol. 30(10) pp. 811–812. (May 1994).*

Loh et al., "Complex grating structures with uniform phase masks based upon the moving fiber–scanning beam technique." Opt. Lett., vol. 20(20) pp. 2051–2053 (Oct. 1995).*

* cited by examiner

Primary Examiner—Martin Angebranndt
(74) Attorney, Agent, or Firm—Ladas & Parry (57) ABSTRACT

A method of writing a Bragg grating in a photosensitive optical waveguide (40) is disclosed comprising utilizing a single coherent beam of light (31) and a diffraction grating (32) to create two coherent working beams (33, 38) of light; positioning a plurality of reflective elements (35, 37) on each side of said waveguide; propagating the two working beams around said plurality of reflective elements, each of the beams being reflected by each of the reflective elements, so that the beams interfere at an initial predetermined position (45); and rotating at least one of the reflective elements on each side of the waveguide to simultaneously independently control the period of the interference pattern and position of the interference pattern in accordance with predetermined requirements so as to produce the grating structure in the photosensitive waveguide.

23 Claims, 8 Drawing Sheets

METHOD AND APPARATUS FOR WRITING GRATINGS

FIELD OF THE INVENTION

This invention relates to the creation of patterns on photosensitive optical materials by placing the materials in the interference pattern generated by the intersection of at least two beams of light, preferably ultra violet light.

BACKGROUND OF THE INVENTION

International Patent Application No. PCT/AU96/00782 filed Dec. 2, 1996 entitled "Ring Interferometer Configuration for Writing Gratings" ("the PCT Application") discloses a system for writing gratings in photosensitive optical materials. The disclosed system has significant advantages in the reduction of noise characteristics in gratings.

Figure 1:
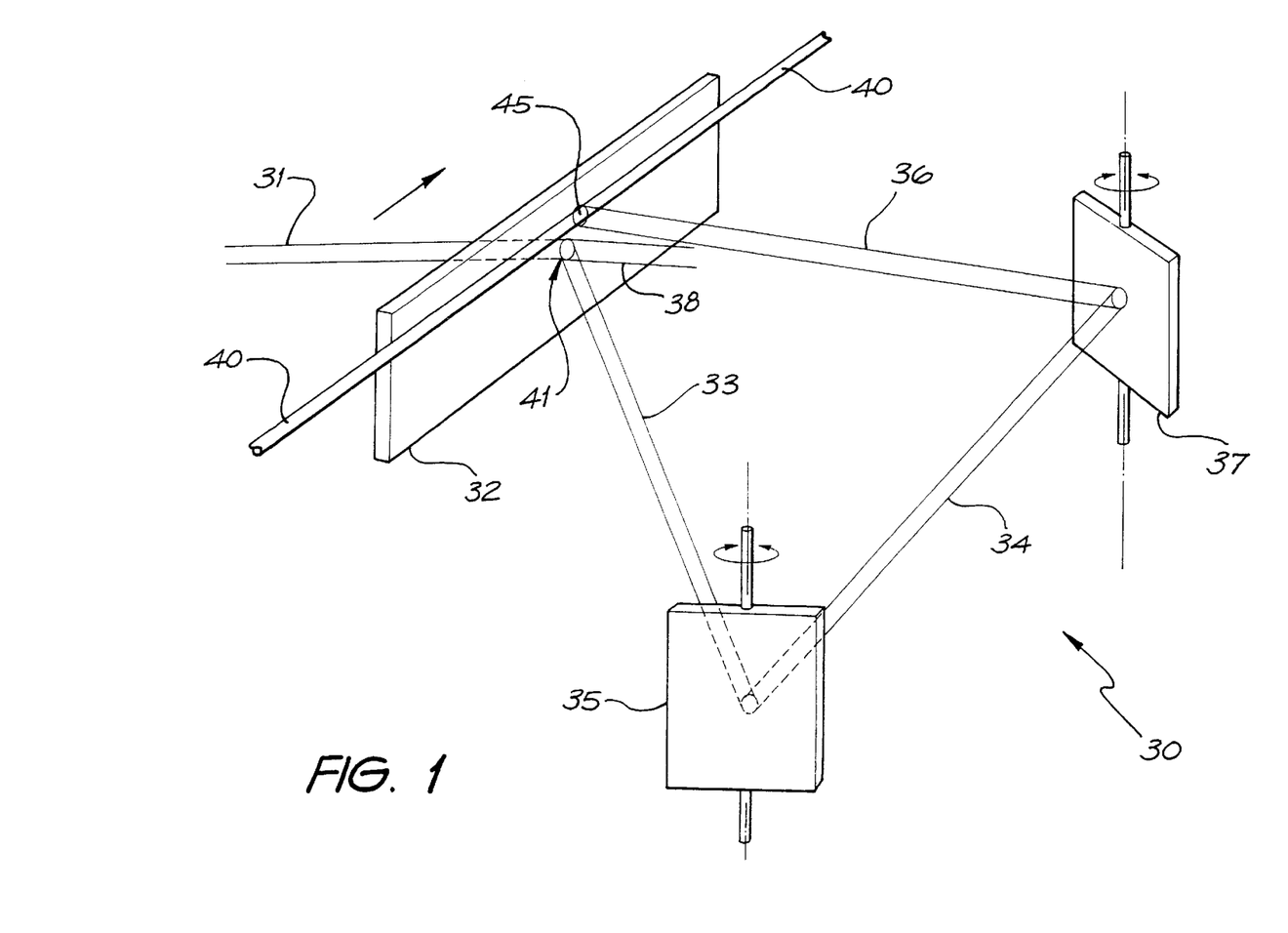
FIG. 1 (referred to previously) illustrates a perspective view of a known form of apparatus for writing gratings.

In FIG. 1 of the drawings attached to this specification, there is illustrated a perspective view of an arrangement 30 constructed in accordance with the principles disclosed in the PCT Application. In the arrangement 30 a narrow UV beam is projected onto a phase mask 32. The phase mask 32 produces at 41 two coherent mode beams 33 and 38. One of the beams 33 is reflected at 34 by mirror 35 before again being reflected at 36 by mirror 37 before projecting upon an optical fibre 40 placed at position 45. The second diffracted beam 38 traverses a counter propagating route (not shown) by reflection from mirror 37 and mirror 35. Both of the diffracted beams are constructed so as to impinge upon area 45, resulting in a "Sagnac" type of arrangement. The two beams 33 and 38, being coherent, form an interference pattern at the point 45. The optical fibre 40, which exhibits photosensitivity, is thereby provided with a modulated refractive index in accordance with the interference pattern. The modulated refractive index is then utilised to form a Bragg grating at the point 45.

The PCT Application further discloses the step of sweeping the UV beam 31 along the phase mask 32 so as to create an extended Bragg grating structure.

Figure 2:
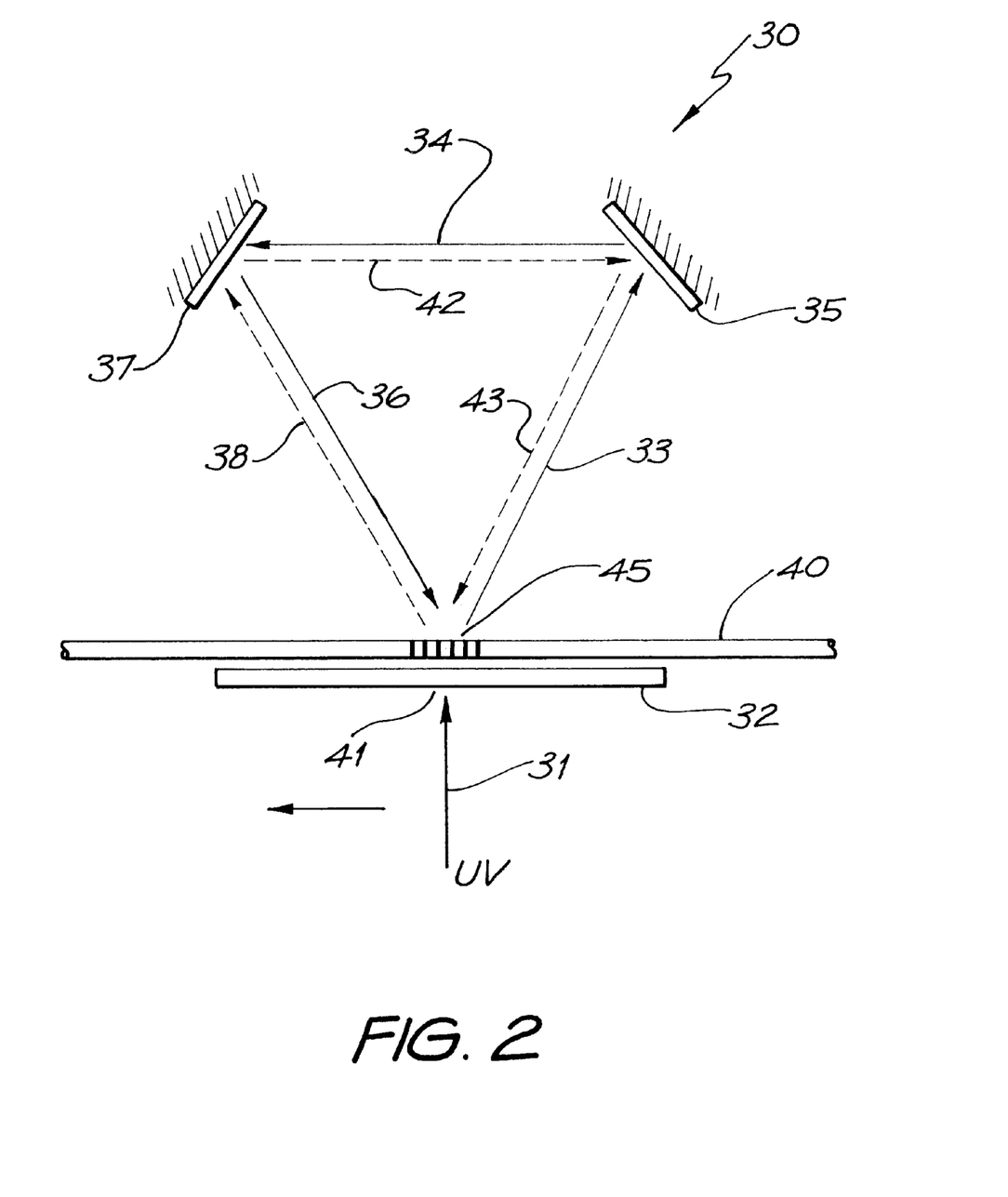
FIG. 2 (also referred to previously) illustrates, in schematic form, the operation of the device of FIG. 1.

FIG. 2 of the attached drawings illustrates the embodiment of FIG. 1 in schematic form and more clearly illustrates the path followed by the reflected beam 33, 34, 36 and the reflected beam 38, 42 and 43.

The PCT Application also discloses rotation of mirrors 35, 37 so as to "chirp" the interference pattern 45 and further discloses moving the optical fibre 40 to a staging area where the maximum interference contrast is obtained. This arrangement provides the advantage that the wavelength of the Bragg grating is thereby tunable and, utilising a single phase mask, the wavelength can be lowered by means of increasing the crossing angle of the writing beams. Of course, altering the crossing angle may cause the overlap region of interference 45 to move away from the optical material 40 but, as disclosed in the PCT Application, the movement can be corrected by moving the fibre to a new location of maximum overlap. This can be achieved by utilising, for example, a small translation stage to mount and move the fibre 40. However, the process of translation of the fibre is extremely complex, requiring the turning off of the laser and the accurate repositioning of the fibre with respect to the interference pattern.

Unfortunately, as noted in the arrangement of the PCT application any movement of the reflecting mirrors results in a corresponding movement of the intersection point of the interfering beams and a change in the angle of intersection of the beams. The change in the angle of intersection will result in a consequential change in the Bragg Wavelength written as the Bragg Wavelength is proportional to the angle of intersection.

Hence, as the mirror angles are changed to, for example, chirp the grating, the point of intersection will move away from or towards the mirrors 35, 37. The fact that the point of intersection of the writing beams is directly related to the angles of each mirror 35, 37 means that it is impossible to vary the Bragg wavelength of the grating without the point of intersection moving. If the fibre is positioned parallel to the phase mask, this orthogonal movement in the beam intersection reduces the effective fringe contrast and apodises the grating in a known but unwanted manner. While this effect can be reduced by aligning the axis of the fibre 80 along the path followed by the intersection of the writing beams, this is only effective if you wish to linearly chirp the grating. Therefore, in the arrangement of FIG. 1 and FIG. 2, the orthogonal movement in the writing beam intersection and the Bragg wavelength are not independently controllable, thereby limiting the amount and type of chirp that can be written into a grating without some degree of unwanted self apodisation.

It has also been found in practice that translation of the UV beam 31 along the phase mask 32 results in a corresponding translation of diffracted beams 33, 38 across the surfaces of mirrors 35, 37. Unless the mirrors 35, 37 are perfectly flat, the path of beams 33, 38 will undergo slight variations in angle and intensity as each beam traverses its mirror surface. This results in the introduction of a "noise" factor which can show up in a grating within fibre 40 as unwanted fluctuations in the frequency response of the grating. In particular, where the grating is a chirped Bragg grating and the fibre 40 is utilised as a dispersion compensator in a telecommunication circuit, the variation from a purely linear response can become significant. This is often evidenced as a significant group delay ripple.

If the fibre 40 is positioned parallel to the phase mask 32, the orthogonal movement of the beam intersection point, as a result of mirror movement, can reduce the effective fringe contrast and apodise the grating in a known but unwanted manner. While this effect may be reduced by aligning the axis of the fibre along the path followed by the intersection of the writing beams, this reduction is generally only effective when a linearly chirped blazed grating is required as the non-perpendicular fibre results in a Blazed grating being produced.

Further, due to the geometry of the writing system 30, it is clear that, as the UV beam is scanned from one end of the phase mask to the other, the distances travelled by the two beams from the phase mask to the point of intersection will not be identical. The difference in path length will vary from approximately minus half the scan length to plus half the scan length. For long grating periods, this path length difference can place high demands on the temporal coherence requirements of the UV source and also can effect the spatial stability of the intersecting beams, and is a further potential source of noise in the written interference pattern.

Additionally, because the fibre 40 must be in a plane either below or above the plane of the UV beam 31 the path length difference between the beams, in combination with the small vertical tilt applied to both mirrors, can cause the intersecting beams to move apart vertically as the UV beam is scanned along the phase mask. This vertical separation can also lead to unwanted self apodisation, loss of grating strength and contrast at the ends of the grating.

Further problems exist with the system 30 when the phase mask is "dithered" so as to apodise the grating in a desired manner. As the mask 32 is dithered, the fringe contrast will be reduced. This effect can be used to apodise the grating within fibre 40. Dither control is important if the noise on the apodised grating profile is to be reduced. If the dither amplitude is not exactly right then unwanted fringes may be written in the fully apodised regions of the grating. Unfortunately, chirped gratings used for dispersion compensation can be extremely sensitive to imperfections in the apodisation profile. It is, therefore, important that the fringe pattern be smoothly extinguished at each end of the grating. The present utilisation of the process of dithering the phase mask is thought to perhaps introduce both unwanted phase and aperture noise in the apodisation profile, leading to unwanted noise on the transmission spectrum and ripples in the group delay characteristic.

SUMMARY OF THE INVENTION

The present invention provides a number of alternative arrangements which alleviate one or more of the aforementioned disadvantages and include an increase in the independent control over the exposure, fringe contrast and period to better approximate ideal gratings.

In accordance with a first aspect of the present invention there is provided a method for creating a grating structure in a photosensitive material, the method comprising the steps of:

utilising a single coherent beam of light and a beam splitting device to create two coherent working beams of light;

propagating the two working beams around a plurality of reflective elements, each of the beams being reflected by each of the reflective elements, so that the beams interfere at an initial predetermined position;

positioning the photosensitive material at a second predetermined position; and rotating one or more of the reflective elements to simultaneously independently control the period and position of the interference pattern in accordance with predetermined requirements and so as to produce the grating structure The beam splitting device preferably comprises a diffraction grating and, in such case, the method preferably comprises simultaneously translating the diffraction grating and the photosensitive material in a direction substantially perpendicular to the single coherent beam so as to create the grating structure in the photosensitive material.

The reflective elements may also be translated relative to the photosensitive material so as to maintain the interference pattern substantially focussed on the photosensitive material.

In the alternative, the method may comprise rotating the reflective elements and simultaneously translating the diffraction grating and the photosensitive material in a direction parallel to the single coherent beam so as to maintain the interference pattern at the predetermined position.

In accordance with another aspect of the present invention there is provided a method for creating a grating structure in a photosensitive material comprising the steps of:

utilising a single coherent beam of light and a diffraction grating to create two coherent working beams of light;

propagating the two working beams around a plurality of reflective elements, each of the beams being reflected by each of the reflective elements, so that the beams interfere at an initial predetermined position;

positioning the photosensitive material at a first position so as to produce an initial portion of the grating structure in a predetermined portion of the photosensitive material;

translating the diffraction grating and the photosensitive material in a direction substantially perpendicular to the single coherent beam so as to produce the grating structure in the photosensitive material; and simultaneously translating the reflective elements relative to the photosensitive material so as to maintain the interference pattern at a position determined in accordance with requirements for the grating structure.

In accordance with a further aspect of the present invention, there is provided a method of writing a Bragg grating in a photosensitive optical waveguide comprising: utilising a single coherent beam of light and a diffraction grating to create two coherent working beams of light; positioning a plurality of reflective elements on each side of said waveguide; propagating the two working beams around said plurality of reflective elements, each of the beams being reflected by each of the reflective elements, so that the beams interfere at an initial predetermined position; and rotating at least one of the reflective elements on each side of the waveguide to simultaneously independently control the period of the interference pattern and position of the interference pattern in accordance with predetermined requirements so as to produce the grating structure in the photosensitive waveguide.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF ALTERNATIVE EMBODIMENTS OF THE PRESENT INVENTION

Figure 3:
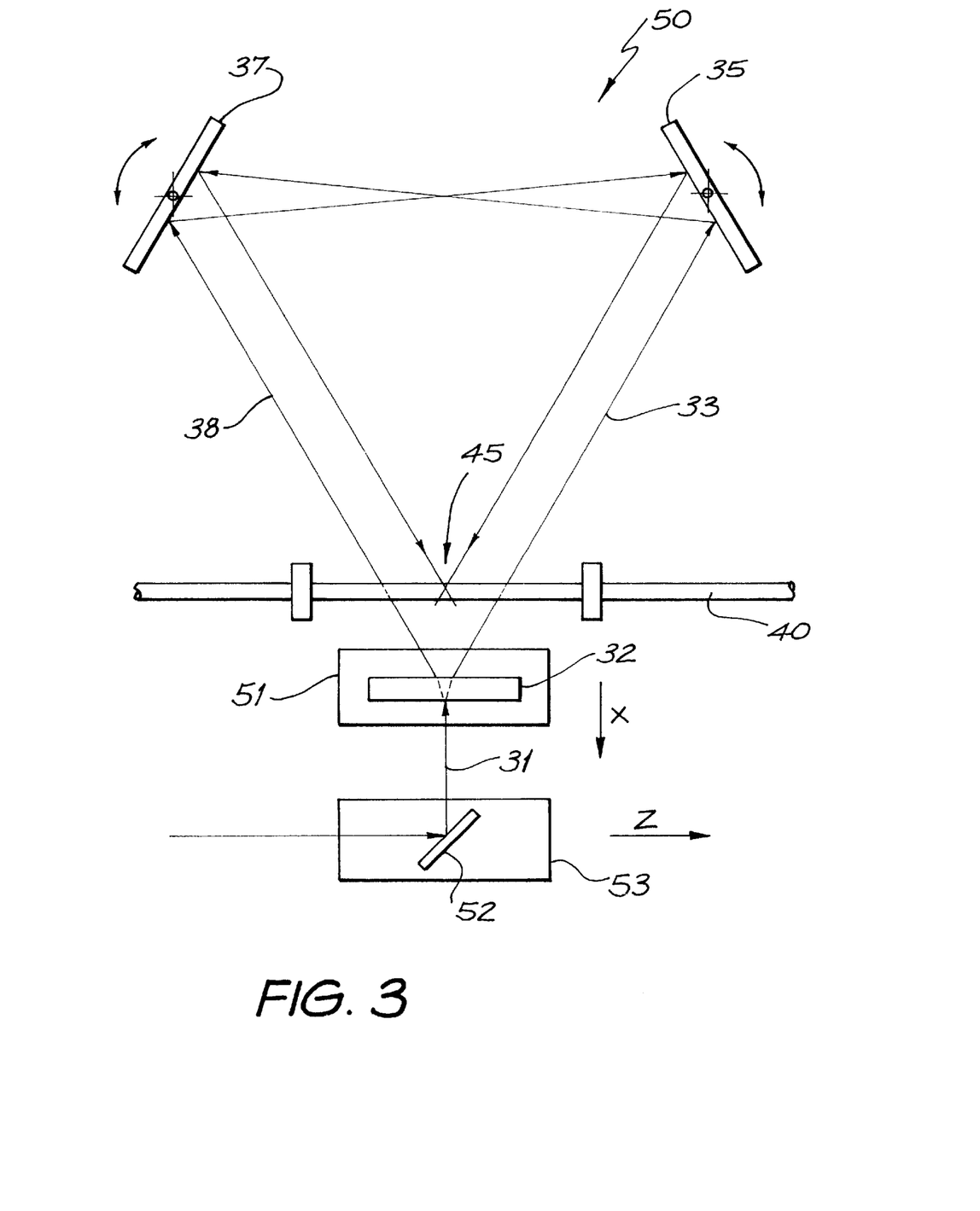
FIG. 3 illustrates schematically a first embodiment of the present invention.

As shown in FIG. 3, there is illustrated a first modification 50 of the previously known arrangement. The modification is suitable for maintaining the overlap region 45 directly on the optical fibre 40 when the mirrors 35, 37 are rotated to alter the grating period. In this arrangement, the phase mask 32 is mounted on a translatable platform 51 which is connected to a linear translation stage (not shown). Further, the UV beam 31 can be scanned along the phase mask 32 by means of mirror 52 mounted on a second translatable stage 53.

As the two mirrors 35, 37 are rotated so as to change the Bragg wavelength of the resulting grating, the phase mask 2 on translatable stage 51 is translated in the X-direction in accordance with requirements so as to maintain the overlap interference pattern at the point 45 on the fibre 40 or at any other required location. When it is required to apodise the grating, the point of intersection of the beams can be moved away from the optical fibre 40, and to thereby produce an apodised reduction in contrast. Alternatively, dithering may be employed. The utilisation of movement of the phase mask 32 in the X-direction in conjunction with the mirror rotation allows for control of the position of the interference pattern during mirror rotation.

Figure 4:
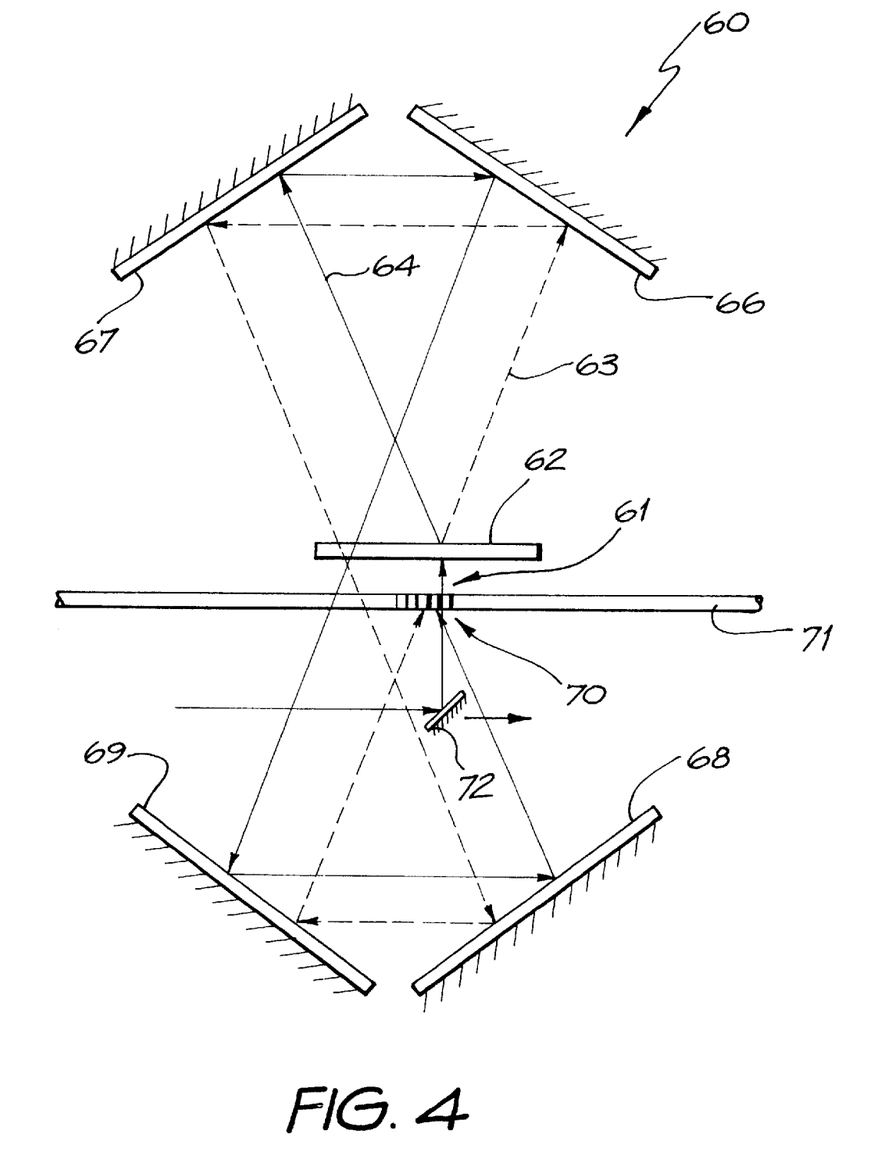
FIG. 4 illustrates schematically a second embodiment of the present invention.

Turning now to FIG. 4, there is illustrated 60 a further modified configuration, hereinafter known as a "butterfly" configuration, which also allows for independent control of the position of the beam intersection point and the Bragg wavelength of resulting grating structures. The arrangement 60 of FIG. 4 relies upon utilising four mirrors 66–69. It will be understood that any even number of mirrors greater than four will also provide the same benefits. The UV beam 61 is scanned along a phase mask 62 using a moveable mirror 72 to thereby produce two first order beams 63, 64. The beam 63 is reflected by mirrors 66, 67, 68 and 69 and then impinges upon fibre 71 at the point 70. The second beam 64 is reflected by mirrors 67, 66, 69 and 68 before impinging also at the point 70 on the fibre 71. The two beams form an interference pattern at the point 70 on the optical fibre 71. By simultaneous adjustment of at least one mirror 66, 67 above the phase mask and one mirror 68, 69 below the phase mask, it is possible to independently control the position of the beam intersection point and the Bragg Wavelength. Further, an apodisation of the grating can be achieved without chirping of the grating.

When apodisation is required, the interference pattern 70 can be made to move off the fibre 71 to thereby apodise the grating. It will be understood that, in accordance with requirements, the positioning of the mirrors, fibre and phase mask can each be vertically displaced and adjusted so that the beams have an uninterrupted path from the phase mask 62 to the fibre 71.

Utilising the arrangement 60 of FIG. 4 one can write an arbitrary chirped profile, at the same time allowing the beam intersection point to track the axis of the fibre, thereby eliminating any self apodisation. Further, the path length difference between the two beams is minimised thereby reducing the high temporal coherence requirement of the UV source. Further, this allows the spatial jitter typically present in UV sources to be more effectively controlled utilising an external feedback loop. In addition, as the path lengths have been substantially equalised, the vertical separation of the writing beams due to the slight vertical tilt applied to each mirror is also significantly reduced, thereby eliminating any unwanted self apodisation effects resulting from the vertical separation of the interfering beams. Further, as the interference point can be separately controlled, any apodisation profile can be created in the written grating.

Unfortunately, the arrangement of FIG. 4 still results in the beams tracking across the surfaces of the mirrors. This can thereby induce noise or ripples in the output spectrum of any resulting grating.

Figure 5:
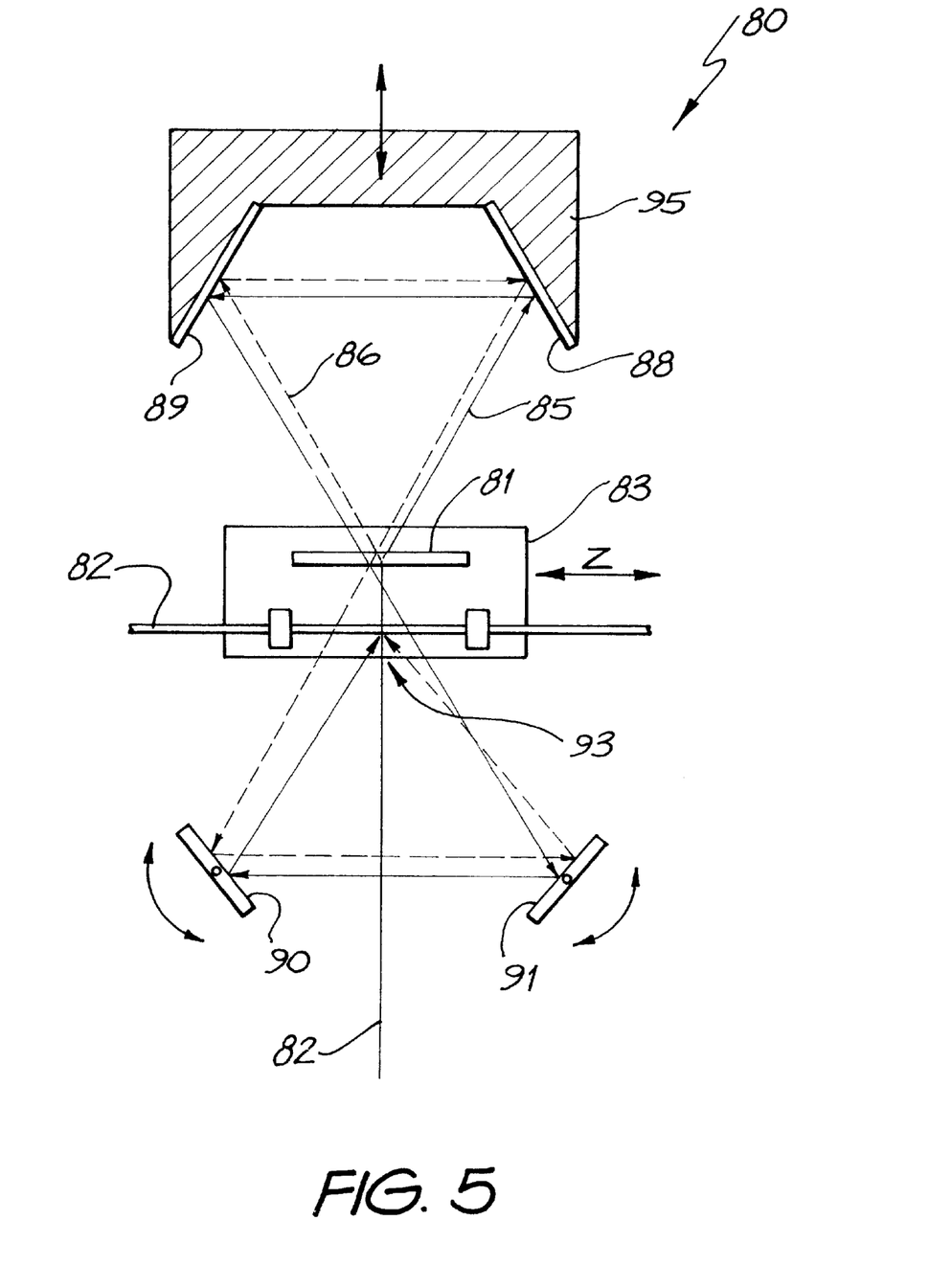
FIG. 5 illustrates schematically a third embodiment of the present invention.

Turning now to FIG. 5, there is illustrated an alternative arrangement 80 directed at reducing the level of uncontrolled and unwanted variations in exposure, contrast and period as well as minimising coherence requirements in a written, grating. The arrangement 80 is similar to the arrangement 60 of FIG. 4, however, instead of the UV beam 82 being tracked across the phase mask 81, the phase mask 81 and optical fibre 82 are mounted on a translation bench 83 and the bench 83 is translated in the Z direction as indicated. In translation in the Z direction, the phase mask 81 is translated across the UV beam 82 such that the path of the beam around the mirror does not change. The phase mask 81 produces two diffraction beams 85,86 which are reflected around the mirror circuit comprising mirrors 88–91 before forming an interference pattern at the point 93 in a similar manner to that described with reference to FIG. 5. In practice, the mirror surfaces 88,89 can be mounted on a fixed surface 95 with the second mirror surfaces 90,91 being able to undergo independent micrometer movements to rotate the mirrors 90,91 and thereby produce a chirp. It would be understood, however, that various alternative rotational mirror arrangements are possible. The important aspect of the arrangement 80 of FIG. 5 being the translation of the phase mask 81 along the beam 82 which results in the extended grating structure. However, due to the periodicity of the phase mask pattern resulting in a corresponding periodicity in the pattern of interference on the fibre 82, the arrangement of FIG. 5 is likely to be only operationally suitable for writing a grating of substantially the same period as the phase mask period.

Figure 6:
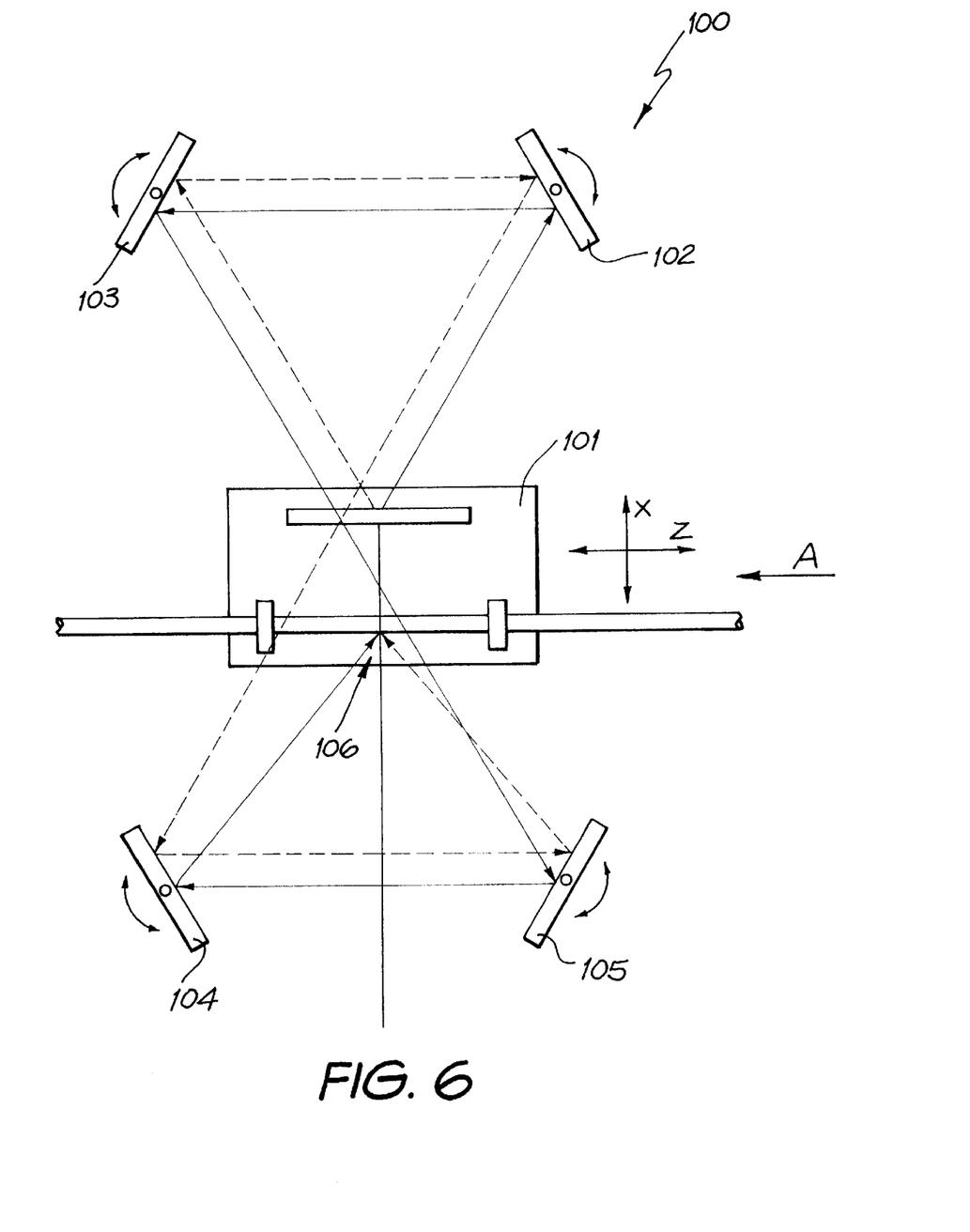
FIG. 6 illustrates schematically a fourth embodiment of the present invention.

Turning now to FIG. 6, there is illustrated a further embodiment 100. This embodiment is similar to that depicted in FIGS. 4 and 5 however, in the example of FIG. 6, the platform 101 is allowed to be translated in both the Z and X direction and the mirrors 102–105 are independently rotatable so as to maintain the interference pattern on a predetermined portion of the fibre at the point 106. The arrangement of FIG. 6 has the advantage that translation of the platform 101 in the X direction assists in maintaining the interference pattern at the position 106 while the mirrors 102–105 are rotated to allow for full chirping. This allows for increased control over the position of the interference pattern when complex chirped grating structures are being written.

Figure 7:
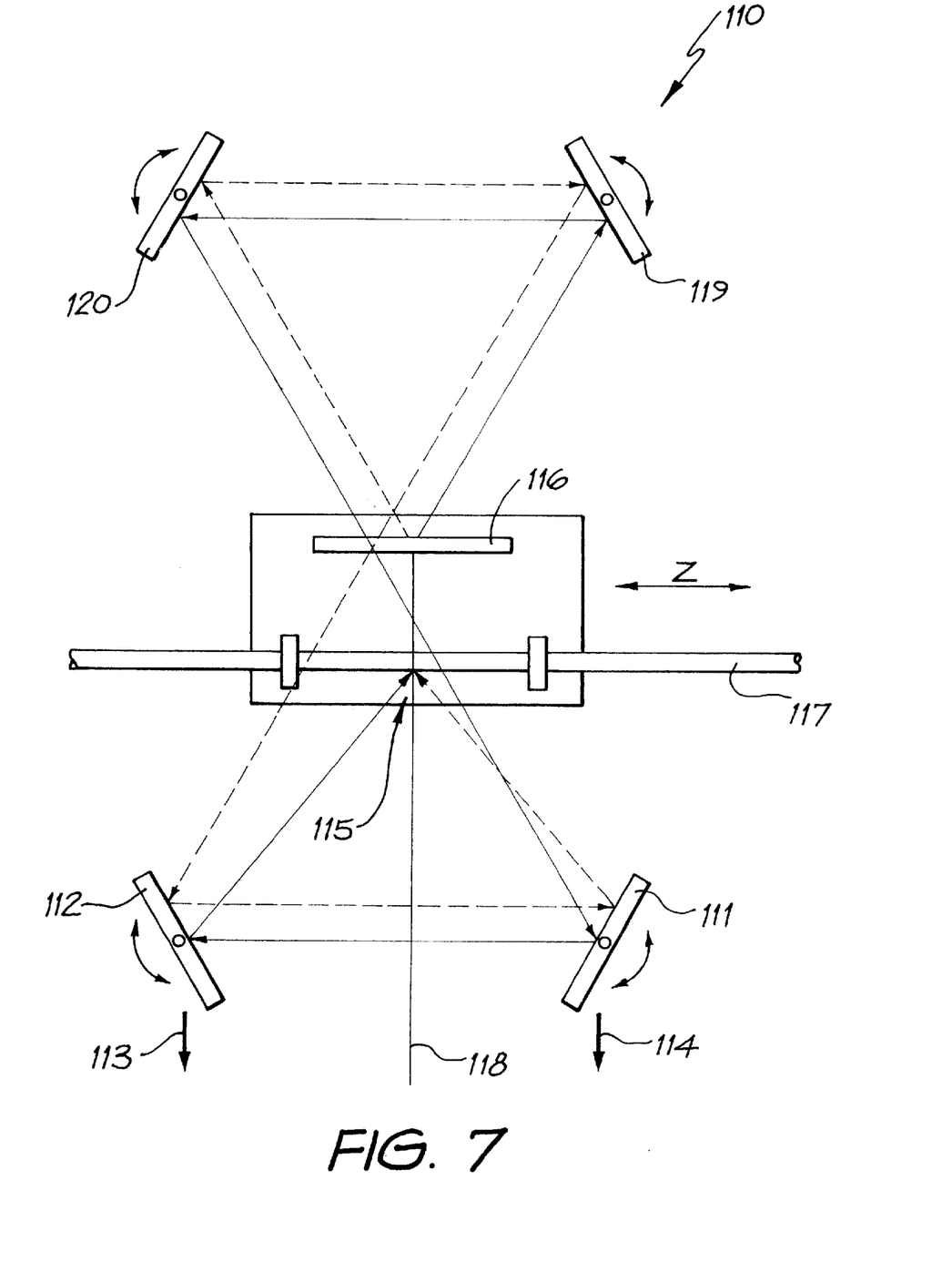
FIG. 7 illustrates schematically a fifth embodiment.

Turning now to FIG. 7, there is illustrated a further alternative embodiment 110. The embodiment 110 is again similar to those of FIGS. 4 to 6, however, in the arrangement 110, the mirrors 111 and 112 are mounted on translatable stages allowing for their independent translation in directions 114, 113. The translation of the mirrors 111 and 112 can be utilised so as to maintain the interference pattern substantially over the region 115 as desired, or any other region which may be required. Phase mask 116 and fibre 117 can then be translated in the Z direction as desired.

The coherent UV beam 118 strikes the phase mask 116 and is split. The mirrors 119, 120 are positioned so that the beam strikes their pivot point. The mirrors are preferably "gimbal" mounted so as to impart the minimum of translation to the beam during rotation such that the purely rotational movement is limited only by the finite beam width as they pivot about their centre. The beams are then reflected to a second set of mirrors, 111, 112. These are also gimbaled and positioned such that the beam strikes their pivot point. Linear translation is utilised to maintain the beam striking position when the Bragg wavelength is changed significantly. The second pair of mirror 111, 112 are also rotated and act, in conjunction with the first pair of mirrors 119, 120 to set the writing wavelength and chirp. Preferably, one pair of mirrors is closer to the phase mask 116 than the other pair so that the Interference pattern can be positioned at any desired spatial location along the fibre. This further allows the overlap position to be controlled independently from the chirp function and allows for an independent "walk-off apodisation" function to be applied. The arrangement of FIG. 7 has the advantage that the only deviation from a perfect Sagnac loop, other than alignment tolerances, is when the Bragg wavelength is changed. Further, by utilising the pivot point of the mirror, path length fluctuations are minimised.

Due to the geometry of the optics in the triangular "ring" configuration, the interference fringes move in the opposite direction as any movement of the phase mask. (ie. the image of the fringes is "flipped" in the ring). In the arrangements of FIG. 5 to FIG. 7 this problem was overcome by adding an opposing "ring" configuration on the other side of the fibre to "flip" the image of the fringes such that they again move in the same direction as the phase mask is moved. This allows the fibre and phase mask to be physically mounted on the same translation stage.

However, as noted previously, when the system is aligned to write gratings of wavelength other than the wavelength generated by contact printing using the phase mask, the fibre must move at a different velocity than that of the phase mask. The explanation of this is that the phase mask sets the phase of the interfering beams, and, by moving the mask one period along the beam the phase is changed by 360° and the intensity of any point in the interference pattern will go through a full cycle and return to its original value ie, the cumulative effect is that the fringes in the interference pattern will move exactly one period regardless of the phase mask period. Therefore, when for example, a lower wavelength is desired, and the fringes are closer together, the fibre will have to move slower than the phase mask relative to the fixed beam. The velocity required is simply ratiometrically related to the desired wavelength in the relation:

$$\frac{v_{fibre}}{v_{p\,mask}} = \frac{\Lambda_{desired}}{\Lambda_{p\,mask}}$$

Where $v$ is the velocity and $\Lambda$ is the period of the fringes produced by the mask in a contact printing application (half the period of the grooves in the mask).

The effect of a velocity mismatch is that the fringe will smear along the fibre causing a small wavelength shift and more importantly a loss of potential grating strength. The amount of smear is dependent upon the beam diameter, but even for the smallest practical beam diameter, the useful wavelength range before grating writing is impractical may be only a few nanometers (based on the typical centre wavelength of 1550 nm). Additionally, velocity error is an even more critical parameter as it will translate directly to a highly detrimental fringe period (ie, phase) error.

Figure 8:
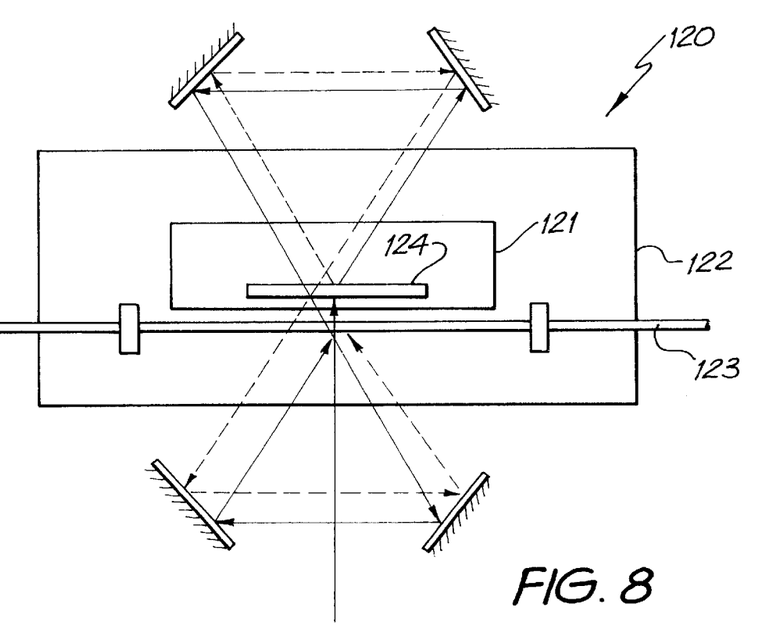
FIG. 8 illustrates schematically a sixth embodiment.

One solution to extend the wavelength range and maximise the grating strength is illustrated 120 in FIG. 8 and includes mounting a second stage 121 on top of a first stage 122 with either only the fibre 123 or only the phase mask 124 mounted on the stage 121 with the case of FIG. 8 illustrating the phase mask mounted on the stage 121. This stage 121 then precisely controls the relative velocity of the fibre 123 and phase mask 124. Velocity error in the bottom stage 122 are present on both the phase mask 124 and fibre 123, and thus do not cause fringe movement across the fibre 123. However, the stage 121 on top requires an extreme degree of accuracy since its velocity errors are between the fibre 123 and phase mask 124.

An accurate way of moving at a relatively slow speed, but with limited range is to use a piezoelectric to drive a flexure stage. The range of movement required is a function both the length of the grating to be written, and the range of wavelengths desired to be written. As accurate Piezoelectric actuators are practically limited to only about 100 microns of travel; their use in this application only slightly increases the flexibility of the writing system.

Figure 9:
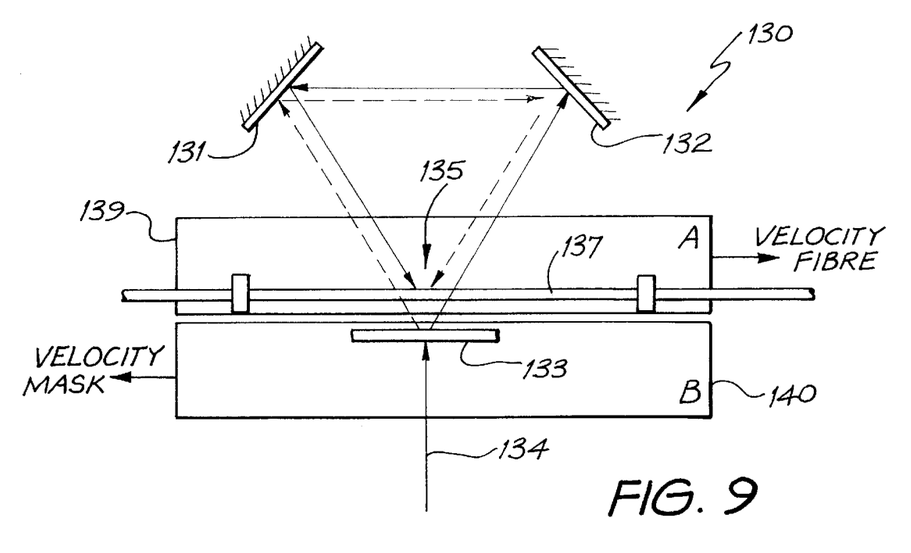
FIG. 9 illustrates schematically a seventh embodiment.

Translation stage technologies with longer travels usually only have suitable accuracy at higher velocities, therefore a further embodiment 130 illustrated in FIG. 9 is provided to maximise the flexibility of the writing system using the standard translation stages. This embodiment is similar to the embodiment to FIG. 3 in that it utilises only two mirrors 131, 132 to create the interference pattern. However, it is similar to the embodiments of FIG. 5 to FIG. 7 in that the phase mask 133 is scanned along the incident beam to create a moving fringe pattern on the fixed overlapping beam region 135. Since this interferometer causes the fringes to move backwards the fibre 137 and phase mask 133 are mounted on separate stages 139, 140 which move in opposing directions. In this way, both stages are operating approximately identically and within their best performance regime. The velocities being dependent on the phase mask frequency and the desired interference frequency.

The important advantage of the embodiment 130 of FIG. 9 is that the ring interferometer or Sagnac loop is fixed throughout the exposure of extended grating structures, which again effectively eliminates the scanning of the UV beam along the face of the mirrors.

It will be obvious to the person skilled in the art that, through the utilisation of the various advances illustrated in the embodiments of FIGS. 3 to 9, grating structures can be produced which are derived from the accurate control over the position of the interference pattern from which the gratings are produced. Further, path length differences can be minimised, thereby overcoming coherence problems with writing extended gratings. Also, the control of the interference pattern allows for the dispensing of the process of dithering the phase mask. Further, the utilisation of the translation of the phase mask rather than translation of the UV beam further reduces the noise effects resulting from the translation of the beams across the surfaces of mirrors utilised.

It would be appreciated by a person skilled in the art that other variations and/or modifications may be made to the present invention as shown in the specific embodiments without departing from the spirit or scope of the invention as broadly described. The present embodiments are, therefore, to be considered in all respects to be illustrative and not restrictive.

We Claim:

1. A method for creating a grating structure in a photosensitive material, the method comprising the steps of:

utilizing a single coherent beam of light and a diffractions grating or other form of beam splitting device to create two coherent working beams of light;

propagating the two working beams around a plurality of reflective elements comprising an even number greater than or equal to four, each of the beams being reflected by each of the reflective elements, so that the beams interfere at an initial predetermined position;

positioning the photosensitive material at a second predetermined position; and rotating one or more of the reflective elements so as to independently control the period of the interference pattern and position of the interference pattern in accordance with predetermined requirements and so as to produce the grating structure in the photosensitive material;

wherein when more than one of said reflective elements are rotated, all of said reflective elements being rotated are rotated simultaneously, whereby said period of said interference pattern or said position of said interference pattern, or both said period and said position of said interference pattern, can be controlled.

2. A method as claimed in claim 1, further comprising simultaneously translating the grating and the photosensitive material in a direction substantially perpendicular to the coherent beam so as to create the grating structure in the photosensitive material.

3. A method as claimed in claim 1 wherein the rotating step further comprises translating the reflective elements relative to the photosensitive material so as to maintain the interference pattern substantially focussed on the photosensitive material.

4. A method as claimed in claim 1 further comprising rotating the reflective elements and simultaneously translating the grating and the photosensitive material in a direction parallel to the single coherent beam so as to thereby maintain the interference pattern at the initial predetermined position.

5. A method as claimed in claim 1, wherein a path length difference between the two working beams of light remains substantially constant when creating said grating structure.

6. A method as claimed in claim 1, wherein the step of creating two coherent beams of light comprises passing a single coherent beam of light through a phase mask so as to produce two different coherent beams of light.

7. A method as claimed in claim 1, wherein the photosensitive material comprises a photosensitive optical waveguide.

8. A method as claimed in claim 7 wherein the optical waveguide is an optical fibre.

9. A method as claimed in claim 1, wherein at least on of the reflective elements undergoes rotational or translational movement in producing the structure.

10. A method as claimed in claim 9 wherein the structure is a chirped Bragg grating.

11. A method as claimed in claim 10 wherein the structure is placed in the plane of the interfering beams, substantially perpendicular to a bisector of the interfering beams.

12. A method as claimed in claim 10 wherein the structure is placed in the plane of the interfering beams at a non-perpendicular angle to a bisector of the interfering beams.

13. A method as claimed in claim 1, wherein the grating is a blazed grating.

14. A method as claimed in claim 1, wherein the structure is an apodised grating.

15. A method for creating a grating structure in a photosensitive material comprising the steps of:

utilizing a single coherent beam of light and a diffraction grating to create two coherent working beams of light;

propagating the two working beams around a plurality of reflective elements, the plurality of reflective elements comprising an even number greater than or equal to four, each of the beams being reflected by each of the reflective elements, so that the beams interfere at an initial predetermined position;

positioning the photosensitive material at a first position so as to produce an initial portion of the grating structure in a predetermined portion of the photosensitive material;

translating the diffraction grating and the photosensitive material in a direction substantially perpendicular to the single coherent beam so as to produce the grating structure in the photosensitive material; and simultaneously translating the reflective elements relative to the photosensitive material so as to maintain the interference pattern at a position determined in accordance with requirements for the grating structure;

whereby said period of said interference pattern or said position of said interference pattern, or both said period and said position of said interference pattern can be controlled.

16. A method as claimed in claim 15 wherein said grating is translated with a first velocity in a first direction and said photosensitive material is translated in said first direction with a second velocity, said second velocity being proportional to the period of the change induced in said interference pattern as a result of movement of said grating with said first velocity.

17. An apparatus for writing gratings comprising:

a source for providing an input beam of coherent (UV) light;

a phase mask for dividing the input beam of light into two coherent working beams of light;

an even number of rotatable reflective elements greater than or equal to four, each of the reflective elements positioned to reflect each of the beams, so that the beams interfere at an initial predetermined position;

a photosensitive waveguide positioned for exposure to an interference pattern, whereby the rotation of the reflective elements independently controls the period of the interference pattern and the position of the interference pattern.

18. An apparatus for writing gratings as claimed in claim 17, wherein the number of reflective elements comprise an even number further including a first translatable stage for supporting the phase mask and the photosensitive waveguide mounted in fixed relationship, said stage for providing linear translation of the phase mask and photosensitive waveguide in a direction perpendicular to the input beam, relative to the source and reflective elements.

19. An apparatus for writing gratings as claimed in claim 18, wherein the first translatable stage further provides linear movement parallel to the input beam.

20. An apparatus for writing gratings as claimed in claim 18, wherein one of said grating and said photosensitive waveguide is mounted on the first translatable stage and the other is mounted on a second translatable stage with said second translatable stage being mounted on said first translatable stage to provide relative linear movement between the phase mask and the photosensitive waveguide in a direction perpendicular to the input beam while maintaining the fixed relationship in a direction parallel to the input beam, and means for controlling the relative velocity between the first and second stages.

21. An apparatus for writing gratings as claimed in claim 18, wherein at least two of the number of rotatable reflective elements are supported for translational movement.

22. An apparatus for writing gratings as claimed in claim 17, wherein the rotatable reflective elements are disposed as a plurality of reflective elements on each of opposite sides of the photosensitive waveguide.

23. An apparatus for writing gratings as claimed in claim 22, wherein the plurality of reflective elements on a first side of the photosensitive waveguide are disposed closer to the phase mask than the plurality of reflective elements on a second side of the photosensitive waveguide.

* * * * *